United States Patent [19]
Iijima

[11] Patent Number: 5,872,414
[45] Date of Patent: Feb. 16, 1999

[54] ELECTRIC ROTATING MACHINE

[75] Inventor: Tatuo Iijima, Nitta, Japan

[73] Assignee: Sawafuji Electric Co., Ltd, Tokyo, Japan

[21] Appl. No.: 838,777

[22] Filed: Apr. 10, 1997

Related U.S. Application Data

[63] Continuation-in-part of Ser. No. 563,285, Nov. 28, 1995, Pat. No. 5,661,357.

[30] Foreign Application Priority Data

Feb. 7, 1995 [JP] Japan ................................ 7-019421
Dec. 12, 1996 [JP] Japan ................................ 8-332292

[51] Int. Cl.$^6$ .............................. H02K 5/00; H02K 5/24
[52] U.S. Cl. ............................... 310/89; 310/43; 310/91
[58] Field of Search ................................ 310/89, 91, 43, 310/154

[56] References Cited

U.S. PATENT DOCUMENTS

| | | | |
|---|---|---|---|
| 4,481,439 | 11/1984 | Stokes | 310/45 |
| 5,055,728 | 10/1991 | Looper et al. | 310/91 |
| 5,089,735 | 2/1992 | Sawaguchi et al. | 310/88 |
| 5,268,607 | 12/1993 | McManus | 310/89 |
| 5,347,187 | 9/1994 | Tsuzaki et al. | 310/40 MM |
| 5,391,955 | 2/1995 | Clarke et al. | 310/242 |
| 5,444,320 | 8/1995 | Clarke et al. | 310/239 |
| 5,471,107 | 11/1995 | Rawls | 310/249 |

*Primary Examiner*—Thomas M. Dougherty
*Assistant Examiner*—Tran N. Ngyuen
*Attorney, Agent, or Firm*—Nikaido Marmelstein Murray & Oram, LLP

[57] ABSTRACT

A casing body made by forming a synthetic resin into a bottomed cylinder-like configuration with a first bracket integrally provided at one end of a cylindrical portion. The cylinder body includes a plurality of clamping portions connected at their base ends to the first bracket at locations equally spaced circumferentially of the cylindrical portion, and magnet retaining portions each protruding to opposite sides from a tip end of each clamping portion. When the casing body is formed by molding, a yoke and a plurality of magnets are integrally coupled to each other. The yoke is clamped between the clamping portions and the cylindrical portion, and the magnets abut against an inner surface of the yoke with their circumferential opposite side ends being defined by the clamping portions and with their axially opposite ends being defined by the first bracket and the magnet retaining portions. Thus, it is possible to reduce the number of producing steps by forming the casing body by molding, and also to eliminate plating and coating steps as well as the step of bonding the magnets to the yoke, leading to a further reduction in a number of producing steps.

9 Claims, 11 Drawing Sheets

ELECTRIC ROTATING MACHINE

This application is a continuation-in-part of Ser. No. 563,285 filed Nov. 28, 1995, now U.S. Pat. No. 5,661,357.

BACKGROUND OF THE INVENTION

1. Field of the Invention

The present invention relates to an electric rotating machine including a rotor which is rotatably supported at axially opposite ends of a casing having a cylindrical yoke and which is coaxially surrounded by the yoke, and magnets disposed at a plurality of points equally spaced apart in a circumferential direction of an inner surface of the yoke.

2. Description of the Related Art

In such a conventional electric rotating machine, the cylindrical yoke and a bracket are integrally formed by drawing from a magnetic metal plate to form a bottomed cylindrical casing body and hence, multi-stage drawing steps are required, resulting in an increased number of production process steps. Moreover, such an electric rotating machine may be used in some cases in a corrosive environment such as on the sea, and for this reason, it is necessary to apply a plating and a coating to the casing body in order to enhance the corrosion resistance. This also results in an increased number of production steps. In addition, the plurality of magnets are bonded to the inner surface of the yoke and hence, a line of bonding the magnets is required independently of the line of producing the casing body.

SUMMARY OF THE INVENTION

Accordingly, it is an object of the present invention to provide an electric rotating machine wherein the number of producing steps is reduced.

To achieve the above object, according to a first aspect and feature of the present invention, there is provided an electric rotating machine, wherein a casing comprises a casing body made by forming a synthetic resin into a bottomed cylinder-like configuration with a first bracket for rotatably supporting one end of a rotor being integrally provided at one end of a cylindrical portion of the casing body surrounding a yoke, and a second bracket which rotatably supports the other end of the rotor and is coupled to the other end of the cylindrical portion of the casing body; the casing body is provided with a plurality of clamping portions which are connected at their base ends to the first bracket at locations equally spaced apart in a circumferential direction of the cylindrical portion and which extend toward the axial other end of the cylindrical portion, and magnet retaining portions are formed to extend respectively from tip ends of the clamping portions in the circumferential direction of the cylindrical portion; and the yoke and a plurality of magnets are integrally coupled to the casing body in molding the casing body, the yoke being clamped between the clamping portions and the cylindrical portion, and the magnets being in abutment against the inner surface of the yoke with their opposite side ends in the circumferential direction of the cylindrical portion being defined by the clamping portions and with their opposite ends in the axial direction of the cylindrical portion being defined by the first bracket and the magnet retaining portions.

With such an arrangement, it is possible not only to reduce the number of producing steps by forming the casing body by molding, but also to eliminate the plating and coating steps as well as a step of bonding the magnets to the yoke, leading to a further reduced number of producing steps.

According to another aspect and feature of the present invention, a pair of insertion bores are formed in one of the clamping portions, which bores can be obtained by a pair of insertion bore forming pins provided in a mold, when the casing body is formed by molding, and a pair of cords connected to a pair of brushes which are in sliding contact with a commutator provided in the rotor are drawn out from the insertion bores to outside of the casing body. Thus, it is possible to draw out the pair of cords outwards from the side of the first bracket, while simplifying the mold and the casing body itself.

According to a further aspect and feature of the present invention, the first bracket has tapered bores provided therein with the diameter gradually increasing axially outwards, the tapered bores being coaxially connected to the insertion bores, and grommets made of an elastomeric material are fitted into the tapered bores, respectively, the cords being passed through the grommets, and a holder is fastened to the first bracket and abuts against both the grommets. Thus, it is possible to easily achieve a reliable water-proof sealing of drawn-out portions of the cords and the inhibition of the movement of the cords in a withdrawing direction with use of a decreased number of parts or components and by a simple assembling.

According to a yet further aspect and feature of the present invention, one end of a rotary shaft provided to the rotor is fitted into a self-aligning bearing having a spherical outer surface; the first bracket is provided, on its inner surface, with a first fitting recess which has a spherical surface to oscillatably support the self-aligning bearing and into which a portion of the self-aligning bearing is fitted, and a second fitting recess which is formed with a diameter larger than that of the first fitting recess to define an annular stepped portion between the second fitting recess itself and an outer end of the first fitting recess; and a metal holder is fixed to the first bracket so that a tip end of its fitting cylindrical portion bites into an inner surface of the second fitting recess, the metal holder including an annular base portion which is in contact with the stepped portion, a retaining portion which is in contact with an outer surface of a portion of the self-aligning bearing protruding from the first fitting recess to exhibit a resilient force urging the self-aligning bearing toward the spherical inner surface of the first fitting recess and which is connected to an inner periphery of the base portion at a plurality of points spaced apart in the circumferential direction of the base portion, and a fitting cylindrical portion which is connected at its base end to the outer periphery of the base portion and formed into a tapered shape such that its diameter gradually increases in a direction away from its base portion.

With such an arrangement, a portion of the self-aligning bearing is fitted into the first fitting recess of the first bracket, and the metal holder is fixed to the first bracket in such a manner that the fitting cylindrical portion thereof is fitted into the second fitting recess and the tip end of the fitting cylindrical portion bites into the inner surface of the second fitting recess. The retaining portion provided to the metal holder is in contact with the outer surface of the portion of the self-aligning bearing which protrudes from the first fitting recess. Therefore, the slip-off of the self-aligning bearing from the first fitting recess is prevented, and the self-aligning bearing is clamped between the first bracket and the metal holder. The casing body made of the synthetic resin needs not to be brought to a relatively high-temperature state. Thus, it is possible to assemble the self-aligning bearing to the casing body having ambient temperature and to increase the degree of freedom in selecting the timing of the assembling. Moreover, the retaining portion exhibits the resilient force urging the self-aligning bearing toward the peripheral inner surface of the first fitting recess, so that the self-aligning bearing can be oscillatably supported between the spherical inner surface of the first fitting recess and the retaining portion.

The above and other objects, features and advantages of the present invention will become apparent from the following description of the preferred embodiments taken in conjunction with the accompanying drawings.

BRIEF DESCRIPTION OF THE DRAWINGS

FIGS. 1 to 12 show a first embodiment of the present invention, wherein

FIG. 1 is a vertical sectional view of a D.C. motor taken along a line 1—1 in FIG. 2;

FIG. 2 is a front view taken in a direction of an arrow 2 in FIG. 1;

FIG. 3 is a sectional view taken along a line 3—3 in FIG. 1, with a rotor and cords removed;

FIG. 4 is a sectional view taken along a line 4—4 in FIG. 1, with the rotor and the cords removed;

FIG. 5 is a front view of a second bracket with a breaker, brushes and coil springs mounted;

FIG. 6 is an exploded perspective view illustrating the second bracket, the brushes, the coil springs and covers;

FIG. 7 is an enlarged vertical sectional view taken along a line 7—7 in FIG. 1;

FIG. 8 is a sectional view taken along a line 8—8 in FIG. 3;

FIG. 9 is a vertical sectional view of a casing body forming mold, taken along a line 9—9 in FIG. 10;

FIG. 10 is a sectional view taken along a line 10—10 in FIG. 9;

FIG. 11 is a sectional view taken along a line 11—11 in FIG. 10; and

FIG. 12 is a sectional view taken along a line 12—12 in FIG. 10.

FIGS. 13 to 15 illustrate a second embodiment of the present invention, wherein

FIG. 13 is a vertical sectional view corresponding to FIG. 1, but illustrating a DC motor according to the second embodiment;

FIG. 14 is an enlarged view of an essential portion of FIG. 13; and

FIG. 15 is a front view of a metal holder.

DETAILED DESCIPTION OF THE PREFERRED EMBODIMENTS

Figure 1:
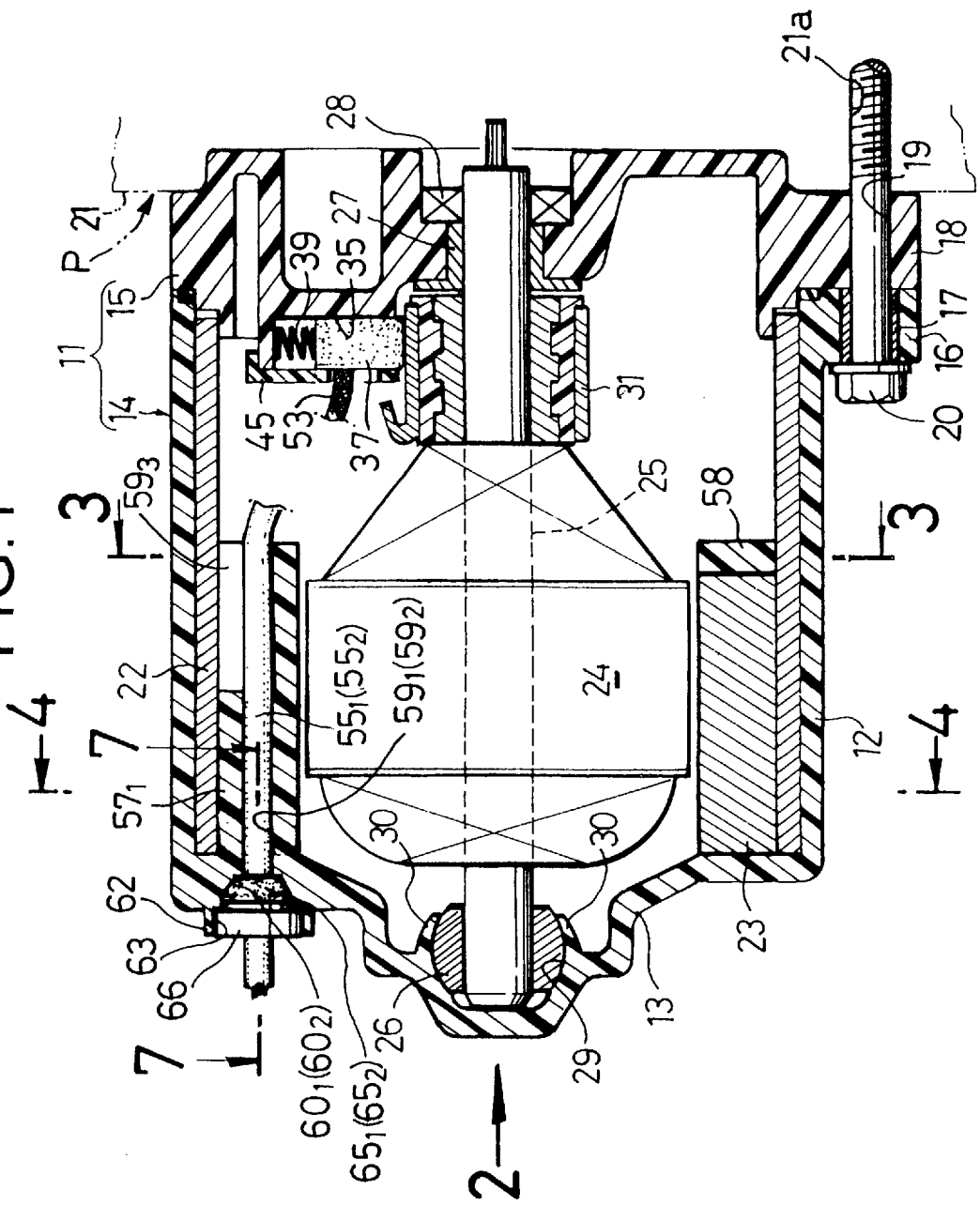
Figure 2:
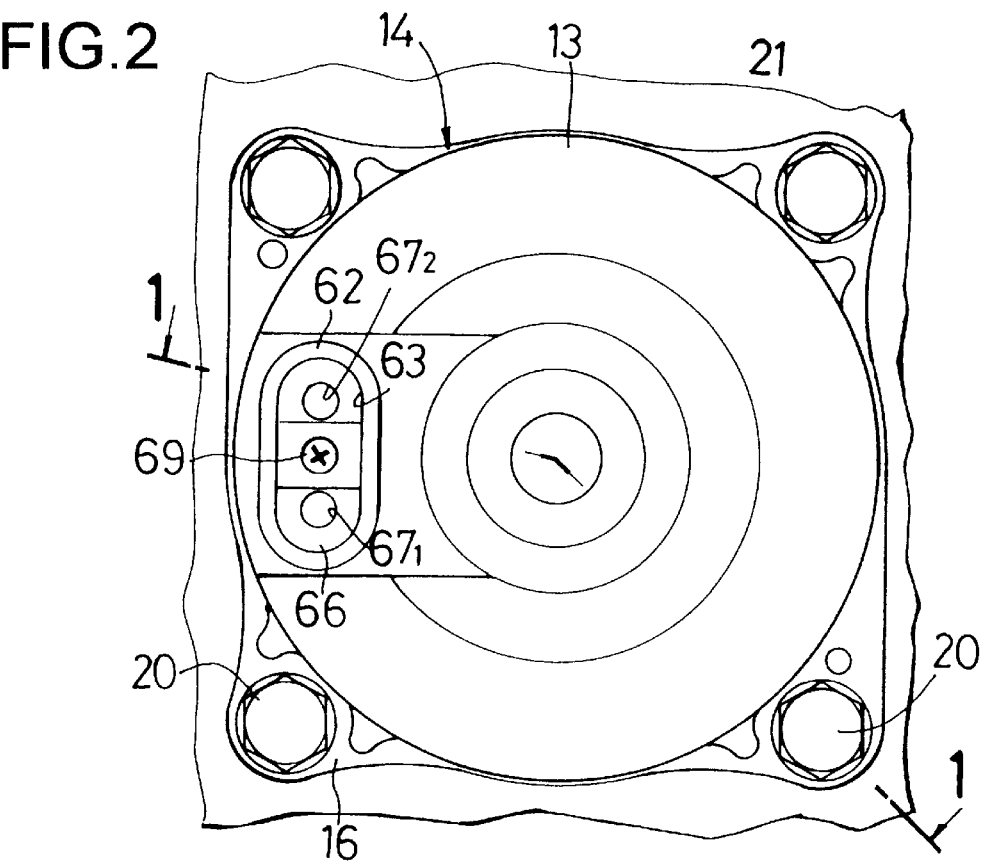

The present invention will now be described by way of a preferred embodiment applied to a D.C. motor with reference to the accompanying drawings.

FIGS. 1 to 12 illustrate a first embodiment of the present invention. Referring first to FIGS. 1 to 4, the D.C. motor is connected to a hydraulic pump P for the tilt-up operation of an outboard engine system. A casing 11 of the D.C. motor is comprised of a casing body 14 formed from a synthetic resin into a bottomed cylinder-like configuration having a first bracket 13 mounted at one end of a cylindrical portion 12, and a second bracket 15 formed from a synthetic resin and coupled to the other end of the cylindrical portion 12 of the casing body 14.

A flange 16 is provided at the other end of the cylindrical portion 12 of the casing body 14 to protrude radially outwardly. Cylindrical metal sleeves 17 are embedded in the flange 16 at four circumferentially and constantly spaced points. The second bracket 15 is formed into a disk-like configuration to close the other end of the cylindrical portion 12, and is provided with a flange 18 which corresponds to the flange 16. Insertion bores 19 corresponding to the sleeves 17 are provided in the flange 18.

Threaded bores 21a corresponding to the insertion bores 19 in the second bracket 15 are provided in a housing 21 of the hydraulic pump P. Bolts 20 inserted into the sleeves 17 and the insertion bores 19 are threadedly engaged into the threaded bores 21a, respectively. Thus, the second bracket 15 is coupled to the casing body 14 to constitute the casing 11, and the casing 11 is fixed to the housing 21 of the hydraulic pump P.

Integrally coupled to the casing body 14 are a yoke 22 which is formed into a cylindrical shape from a magnetic metal and mounted on an inner periphery of the cylindrical portion 12, and a pair of magnets 23 which are formed into an arcuate shape corresponding to an inner peripheral surface of the yoke 22 and which are disposed on an inner surface of the yoke 22 at its circumferentially spaced points.

A rotor 24 is concentrically disposed within the cylindrical portion 12 of the casing body 14 and rotatably supported by the first and second brackets 13 and 15. More specifically, one end of a rotary shaft 25 of the rotor 24 is supported on the first bracket 13 through a self-aligning bearing 26. The other end of the rotary shaft 25 is extended through the second bracket 15 toward the housing 21. A metal bearing 27 and an annular seal member 28 are interposed between the second bracket 15 and the rotary shaft 25.

A supporting recess 29 and a plurality of retaining claws 30 are provided on an inner surface of a central portion of the first bracket 13 along an outer surface of the self-aligning bearing 26. The retaining claws 30 are disposed at circumferentially equally spaced locations around the supporting recess 29 and connected to an inner surface of the supporting recess 29. The self-aligning bearing 26 is fitted into the supporting recess 29 while flexing the retaining claws 30 in an expanding direction and is slidably retained by the supporting recess 29 and the retaining claws 30. The first bracket 13 is integrally formed with the cylindrical portion 12 from a synthetic resin. And at the time of molding the first bracket 13, the supporting recess 29 and the retaining claws 30 are simultaneously formed. Therefore, it is unnecessary to fix a member for retaining the self-aligning bearing metal 26 to the first bracket 13, thereby making it possible to reduce the number of parts and the number of working steps.

Figure 5:
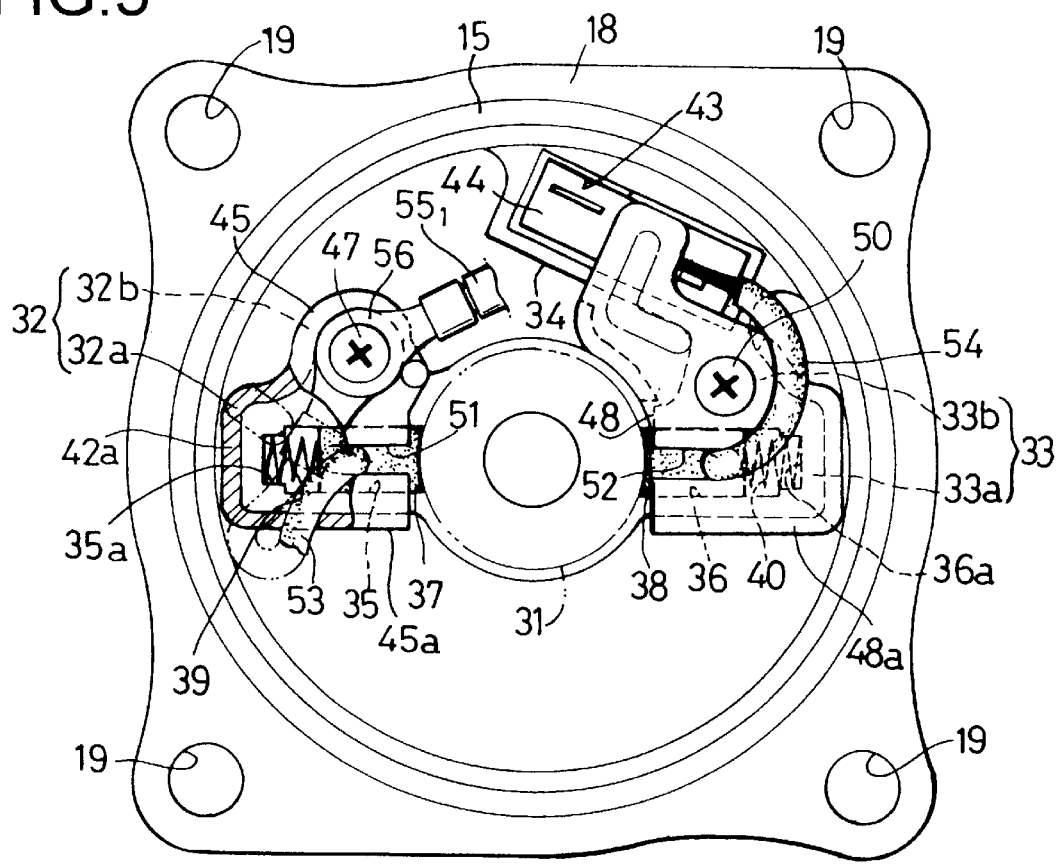
Figure 6:
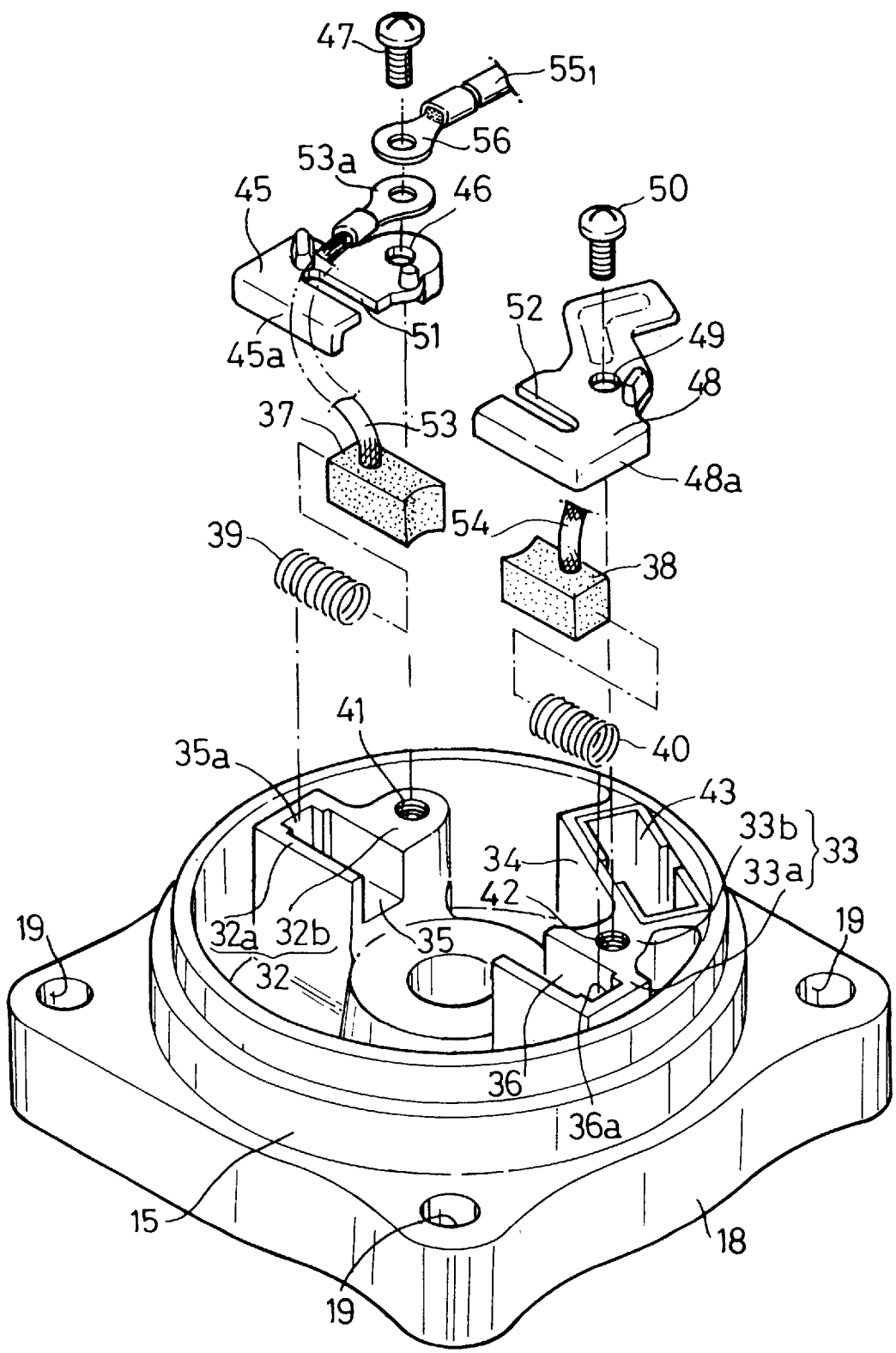

Referring also to FIGS. 5 and 6, a commutator 31 is mounted on the rotary shaft 25 of the rotor 24 adjacent the second bracket 15. The second bracket 15 is integrally provided in its inner surface with first and second brush holders 32 and 33 which are risen inwardly in an axial direction of the rotary shaft 25 on a diametrical line of the commutator 31, and with a breaker holder 34 which is risen inwardly in the axial direction of the rotary shaft 25 at a location in proximity to the second brush holder 33.

Each of the brush holders 32 and 33 includes a main holder portion 32a, 33a formed into a substantially U-shape in cross section and extending radially of the rotary shaft 25, and a fastening portion 32b, 33b connected to one side of the main portions 32a, 33a. The fastening portion 33b is provided to extend between the main portion 33a and the breaker holder 34.

Guide grooves 35 and 36 are provided in the main holder portions 32a and 33a, respectively and extend radially of the rotary shaft 25. Outer ends of the guide grooves 35 and 36 are closed and inner ends thereof are opened. Brushes 37 and 38 are slidably fitted in the guide grooves 35 and 36, respectively. Coil springs 39 and 40 are compressed between the brushes 37 and 38 and the closed outer ends of the guide grooves 35 and 36 for exhibiting a spring force in a direction to bring ends of the brushes 37 and 38 protruding from inner ends of the guide grooves 35 and 36 into sliding contact with the commutator 31, respectively. Moreover, each of the guide grooves 35 and 36 has a recess 35a, 36a provided at its radially outer closed end, into which one end of corresponding one of the coil springs 39 and 40 can be fitted for temporary fixing of the coil springs 39 and 40. Threaded bores 41 and 42 are provided in the fastening portions 32b and 33b and have axes parallel to the rotary shaft 25.

An accommodation recess 43 is provided in the breaker holder 34, and a breaker 44 is fitted into the accommodation recess 43.

A cover 45 is mounted to the first brush holder 32 to cover the first brush holder 32 in order to inhibit the slip-off of the brush 37 from the guide groove 35. More specifically, an insertion bore 46 corresponding to the threaded bore 41 is provided in the cover 45, and the cover 45 is fastened to the first brush holder 32 by threadedly inserting a threaded member 47 through the insertion bore 46 into the threaded bore 41. Moreover, the cover 45 has an engage portion 45a provided thereon, which is engaged with an outer side of the first brush holder 32 in a direction to inhibit the turning of the cover 45 about an axis of the threaded bore 41.

A cover 48 is mounted to the second brush holder 33 to cover the entire surface of the second brush holder 33 and a portion of the breaker holder 34 in order to inhibit the slip-off of the brush 38 from the guide groove 36 and the slip-off of the breaker 44 from the accommodation recess 43 in the breaker holder 34. More specifically, an insertion bore 49 corresponding to the threaded bore 42 is provided in the cover 48, and the cover 48 is fastened to the second brush holder 33 by threadedly inserting a threaded member 50 through the insertion bore 49 into the threaded bore 42. Moreover, the cover 48 is provided with an engage portion 48a, which is engaged with an outer side of the second brush holder 33 in a direction to inhibit the turning of the cover 48 about an axis of the threaded bore 42.

Slits 51 and 52 are provided in those portions of the covers 45 and 48 which correspond to the guide grooves 35 and 36, respectively, to extend a long distance along one diametrical line of the rotary shaft 25. Connection cords 53 and 54 connected to the brushes 37 and 38 are drawn from the slits 51 and 52, respectively. The connection cord 53 is connected at its one end to the brush 37, and at the other end to a terminal 53a. The terminal 53a is fixed to the cover 45 by the threaded member 47 along with a terminal 56 which is provided at an end of a cord $55_1$ drawn outwardly from the first bracket 13. The connection cord 54 is connected at its one end to the brush 38, and is electrically connected at the other end to one end of the breaker 44. A cord $55_2$ drawn outwardly from the first bracket 13 is electrically connected to the other end of the breaker 44. Thus, the cord $55_1$ is connected to the brush 37 through the connection cord 53, and the cord $55_2$ is connected to the brush 38 through the breaker 44 and the connection cord 54. These cords $55_1$ and $55_2$ are drawn outwardly from the first bracket 13.

Figure 7:
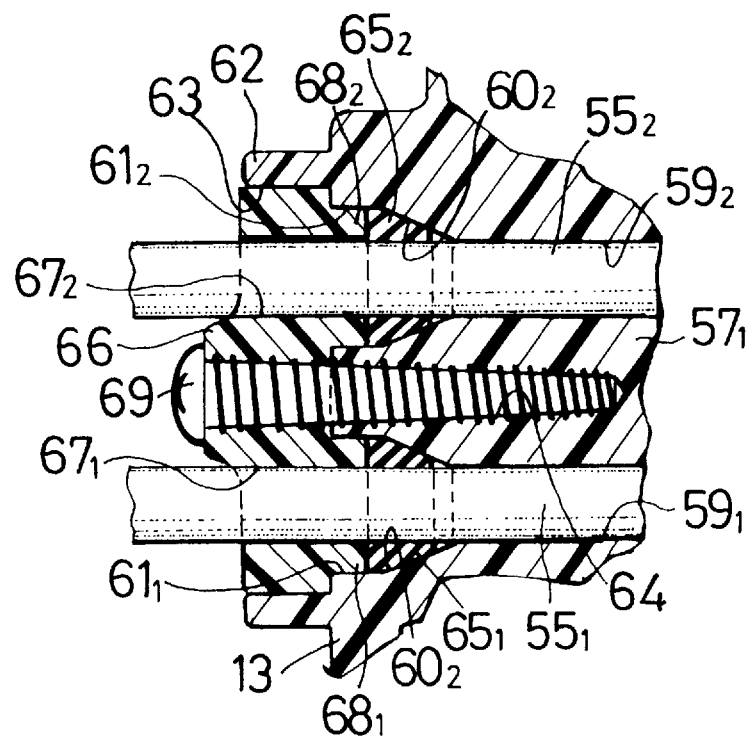
Figure 8:
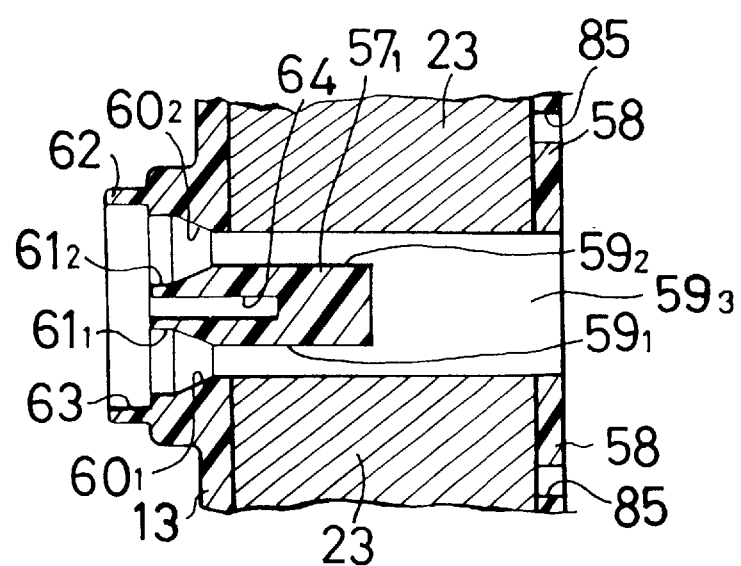
Figure 9:
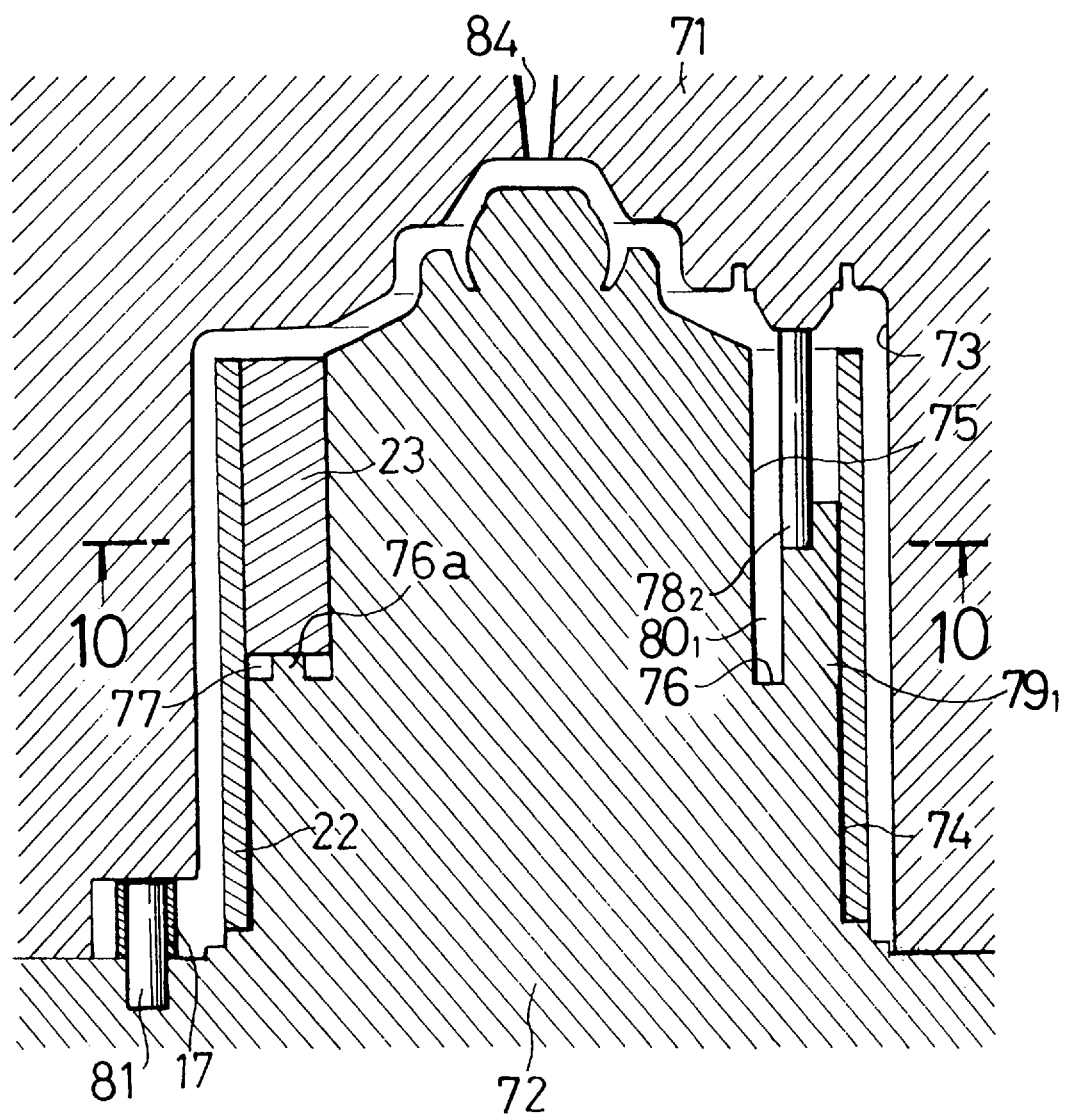
Figure 10:
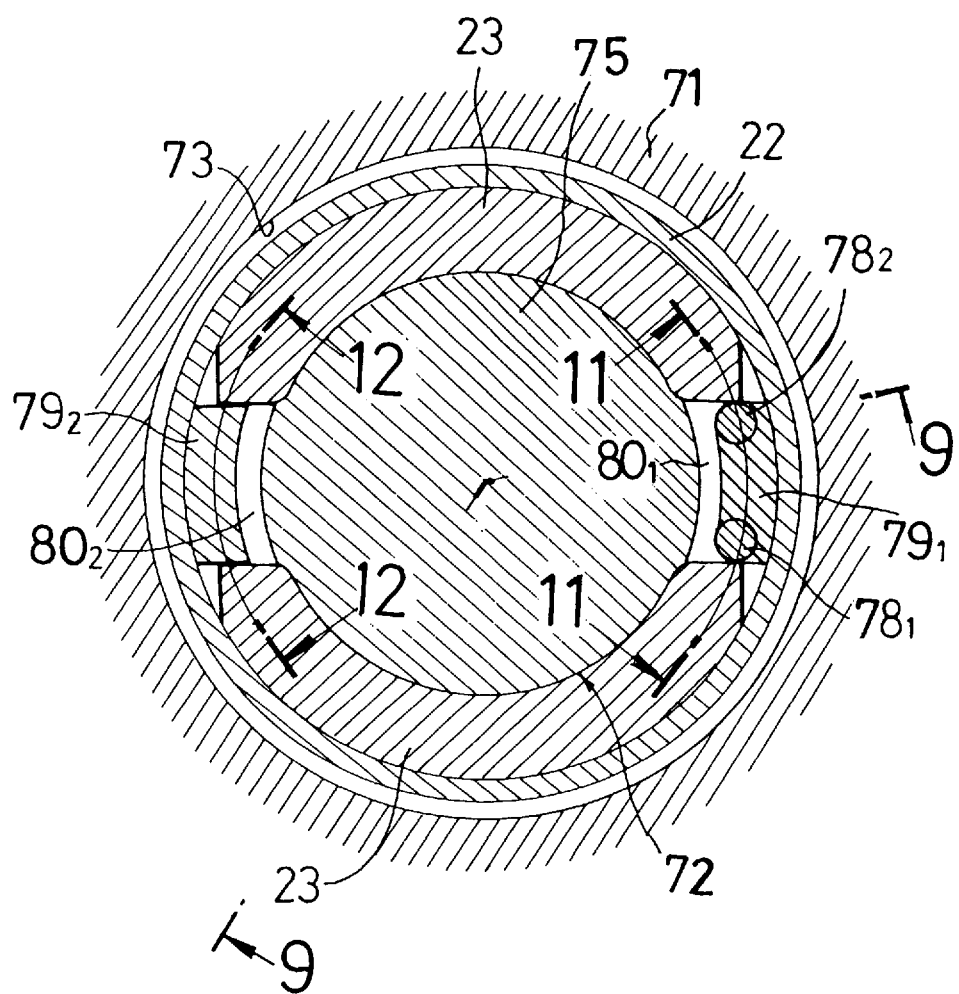
Figure 11:
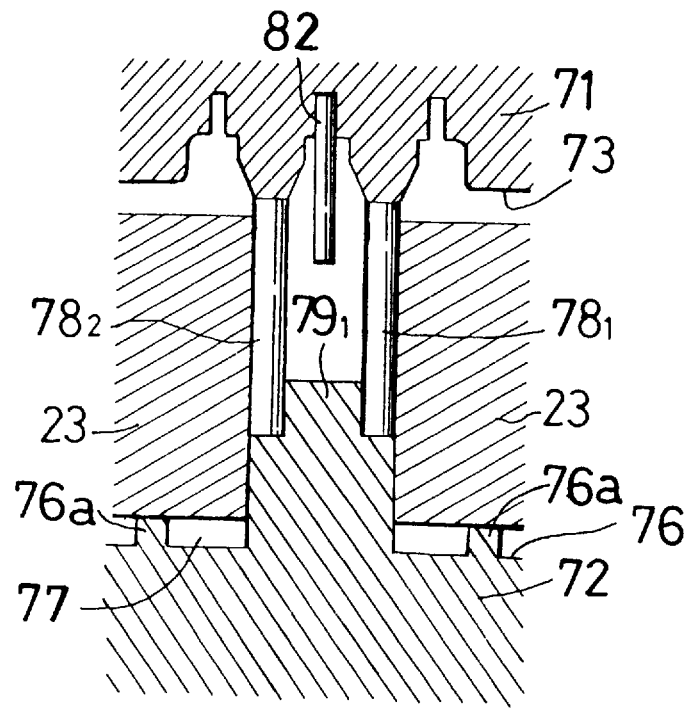
Figure 12:
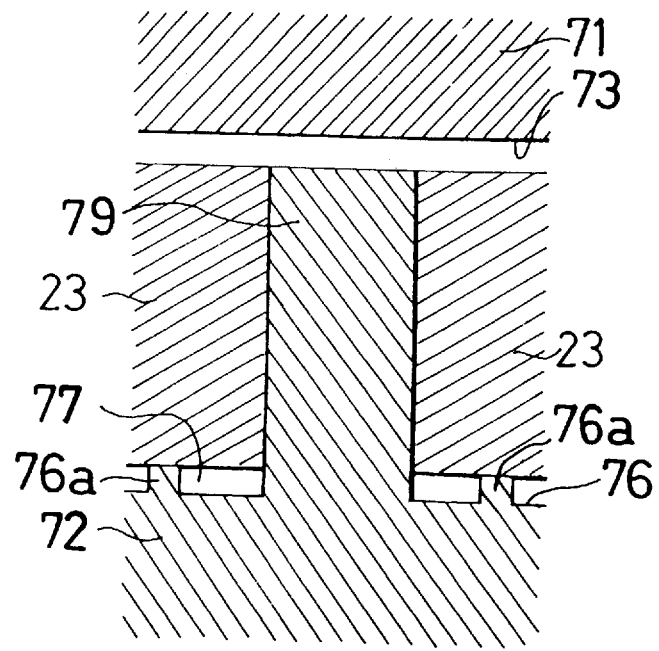

Referring also to FIGS. 7 and 8, base ends of clamping portions $57_1$ and $57_2$ are continuously formed with the first bracket 13 of the casing body 14 at locations equally spaced apart from each other in a circumferential direction of the cylindrical portion 12. The clamping portions $57_1$ and $57_2$ extend toward the second bracket 15 in the axial direction of the cylindrical portion 12. That is, the clamping portions $57_1$ and $57_2$ are continuously formed with the first bracket 13 so as to clamp the yoke 22 between the clamping portions $57_1$ and $57_2$ and the inner surface of the cylindrical portion 12. The distance between both the clamping portions $57_1$ and $57_2$ is set such that circumferentially opposite side ends of the magnets 23 are defined by the clamping portions $57_1$ and $57_2$, respectively. The inner surface of each of the clamping portions $57_1$ and $57_2$ is formed into an arcuate shape in such a manner that it is substantially in line with the inner surface of the magnet 23 which is in abutment against the inner surface of the yoke 22.

Moreover, magnet retaining portions 58 extend from tip ends of the clamping portions $57_1$ and $57_2$ in the circumferentially opposite directions of the cylindrical portion 12. The magnets 23 are in abutment against the inner surface of the yoke 22 with their opposite ends in the circumferential direction of the cylindrical portion 12 being defined by the clamping portions $57_1$ and $57_2$. One ends of the magnets 23 in the axial direction of the cylindrical portion 12 are in abutment against the first bracket 13. The other ends of the magnets 23 are received by the magnet retaining portions 58. The magnet retaining portions 58 extending from the clamping portion $57_1$ and the magnet retaining portions 58 extending from the clamping portion $57_2$ are interconnected in this embodiment, and alternatively, they may be separated from each other.

A pair of insertion bores $59_1$ and $59_2$ are provided in one $57_1$ of the clamping portions $57_1$ and $57_2$ at its base end to extend axially of the cylindrical portion 12, so that portions of the ends of the magnets 23 face the insertion bores $59_1$ and $59_2$. lightening recess $59_3$ is also provided in one clamping portion $57_1$ to lead to the insertion bores $59_1$ and $59_2$ at the tip end of clamping portion $57_1$.

The following bores are provided in the first bracket 13: tapered bores $60_1$ and $60_2$ which coaxially connected to the insertion bores $59_1$ and $59_2$, respectively and tapered such that the diameter is gradually increased in an axially outward direction; and fitting bores $61_1$ and $61_2$ which are coaxially connected to large-diameter ends of the tapered bores $60_1$ and $60_2$ and open into the outer surface of the first bracket 13. A ridge 62 is provided on the outer surface of the first bracket 13, such that an oval-shaped fitting recess 63 is defined and connected to both of the fitting bores $61_1$ and $61_2$. A bottomed fastening bore 64 is provided in the first bracket 13 and the clamping portion $57_1$, such that it opens into the outer surface of the first bracket 13 between both the fitting bores $61_1$ and $61_2$.

The cord $55_1$ connected to the brush 37 through the connection cord 53 as well as the cord $55_2$ connected to the brush 38 and the breaker 44 through the connection cord 54 are inserted through the insertion bores $59_1$ and $59_2$ and the lightening recess $59_3$. Grommets $65_1$ and $65_2$ made of an elastomeric material are fitted into the tapered bores $60_1$ and $60_2$, and the cords $55_1$ and $55_2$ are passed through the grommets $65_1$ and $65_2$.

A holder 66 is fitted into the fitting recess 63 in the first bracket 13 and has a pair of bores $67_1$ and $67_2$, through which the cords $55_1$ and $55_2$ are inserted. The holder 66 is also provided with urging pins $68_1$ and $68_2$ which are each formed into a cylindrical shape and coaxially connected to the bores $67_1$ and $67_2$ and which are fitted into the fitting bores $61_1$ and $61_2$ to abut against the grommets $68_1$ and $68_2$, respectively.

The holder 66 is fastened to the first bracket 13 by screwing, into the fastening bore 64, a threaded member 69 inserted through the holder 66. In such a condition, the grommets $65_1$ and $65_2$ are urged against inner surfaces of the tapered bores $60_1$ and $60_2$ by the urging pins $68_1$ and $68_2$ of the holder 66, and compressed axially into close contact with the cords $55_1$ and $55_2$. This achieves a reliable water-proof sealing at drawn-out portions of the cords $55_1$ and $55_2$ and inhibits the movement of the cords $55_1$ and $55_2$ in a drawing-out direction.

The yoke 22 is sandwiched between the clamping portions $57_1$ and $57_2$ and the cylindrical portion 12 in the casing body 14. The magnets 23 are in abutment against the inner surface of the yoke 22 with their opposite side ends in the circumferential direction of the cylindrical portion 12 being defined by the clamping portions $57_1$ and $57_2$. Opposite ends of the magnets 23 in the axial direction of the cylindrical portions 12 are defined by the first bracket 13 and the magnet retaining portions 58. When the casing body 14 is molded, the yoke 22 and the pair of magnets 23 are integrally coupled to the casing body 14. A mold for forming the casing body 14 will be described below.

Referring to FIGS. 9 to 12, in forming the casing body 14, an upper die 71 and a lower die 72 movable toward and from each other are prepared. A forming recess 73 is provided in the upper die 71 to face the lower die 72 and conformed to the contour of the outer surface of the casing body 14 to be molded. The lower die 72 is provided with a large-diameter columnar portion 74 which protrudes into the forming recess 73 so as to mate with a substantially half of the yoke 22, and a smaller-diameter columnar portion 75 which defines the inner peripheral surfaces of the pair of magnets 23 in abutment against the yoke 22. An annular stepped portion 76 is formed between the large-diameter columnar portion 74 and the smaller-diameter columnar portion 75. A plurality of projections 76a circular in cross section are provided at distances on the stepped portions 76 at locations corresponding to the magnets 23.

Figure 3:
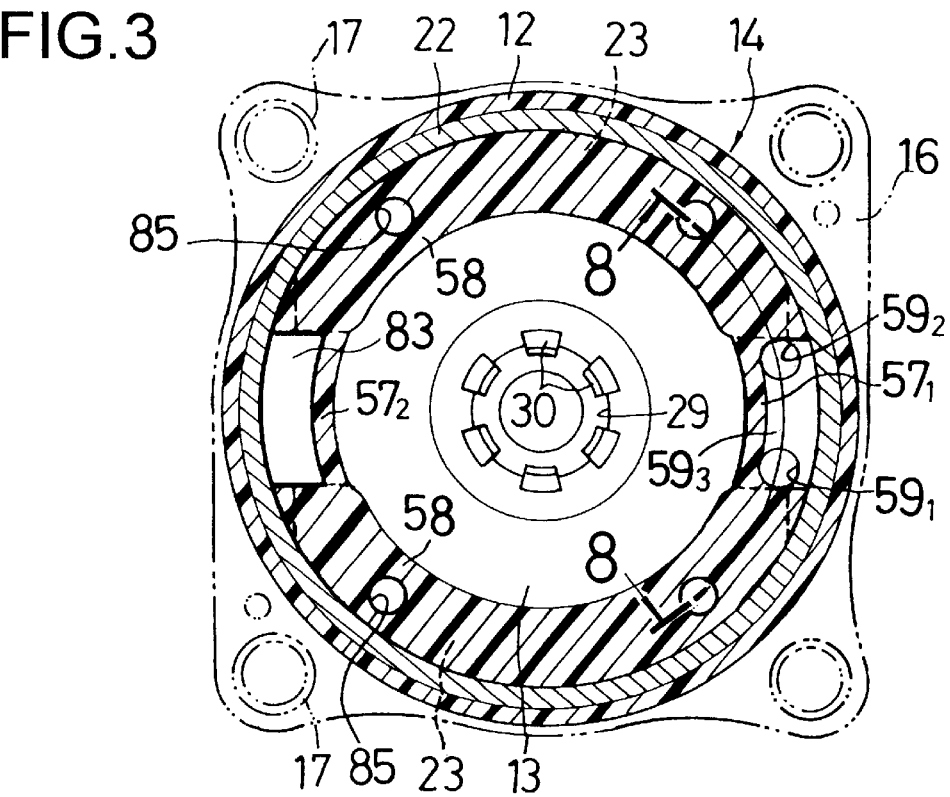

In a condition in which the upper and lower dies 71 and 72 have been opened, the yoke 22 is mounted to the lower die 72 in such a manner that the large-diameter columnar portion 74 is fitted to a lower half of the yoke 22. The pair of magnets 23 are inserted between the yoke 22 and the smaller-diameter columnar portion 75 at two circumferentially equally spaced points and received by the projections 76a on the stepped portion 76. Thus, spaces 77 for forming the magnet retaining portions 58 are defined between the magnets 23 and the stepped portion 76, and bores 85 corresponding to the projections 76a are defined in the magnet retaining portions 58, as shown in FIG. 3.

A limiting portion $79_1$ for forming the lightening recess $59_3$ in the clamping portion $57_1$ in one of the spaces between both the magnets 23 is provided in the lower die 72 so as to define a gap $80_1$ between the limiting portion $79_1$ itself and an outer surface of the smaller-diameter clamping portion $57_1$. A pair of insertion bore forming pins $78_1$ and $78_2$ are embedded in the lower die 72. A limiting portion $79_2$ is provided in the lower die 72 in the other of the spaces between both the magnets 23 so as to define a gap $80_2$ between the limiting portion $79_2$ itself and the outer surface of the smaller-diameter clamping portion $57_1$.

When the casing body 14 is formed by molding, the insertion bore forming pins $78_1$ and $78_2$ form the pair of insertion bores $59_1$ and $59_2$ in the clamping portion $57_1$. The insertion bore forming pins $78_1$ and $78_2$ also act to limit the movement of the magnets 23, 23 toward each other in the circumferential direction of the yoke 22 by the abutment of the pins against one side ends of the magnets 23, 23 in the circumferential direction of the yoke 22 along with the limiting portion $79_1$.

Figure 4:
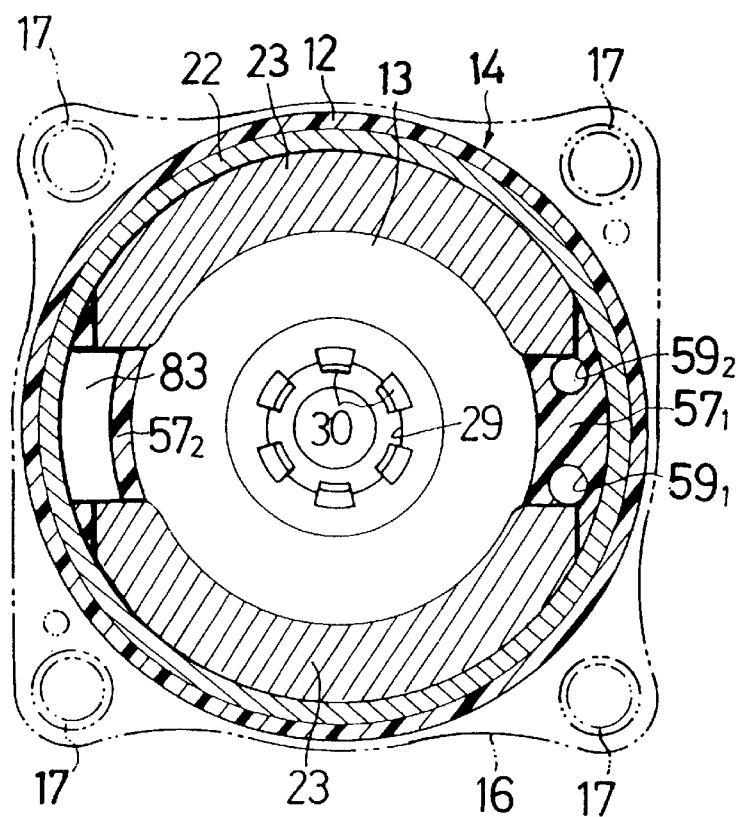

The other side ends of the magnets 23 in the circumferential direction of the yoke 22 abut against the limiting portion $79_2$, so that the movement of the magnets 23 toward each other in the circumferential direction of the yoke 22 is also limited by the limiting portion $79_2$. Thus, a gap 83 is defined in the clamping portion $57_2$ of the casing body 14 at a location corresponding to the limiting portion $79_2$, as shown in FIGS. 3 and 4.

Further, support pins 81 for supporting the sleeves 17 are embedded in the lower die 72, while pin 82 for forming the fastening bore 64 is embedded in the upper die 71, and a pouring port 84 for pouring a synthetic resin is provided in the upper die 71.

The operation of this embodiment will be described below. The first and second brush holders 32 and 33 are integrally provided on the second bracket 15 made of a synthetic resin. It is unnecessary to provide an exclusive component in addition to the second bracket 15. This contributes to a reduction in number of parts or components.

Since the recesses 35a and 36a are provided at the closed outer ends of the guide grooves 35 and 36 provided in the brush holders 32 and 33, and since one ends of the coil springs 39 and 40 can be fitted into and temporarily fixed in the recesses 35a and 36a, it is possible to reliably prevent the jumping-out of the coil springs 39 and 40 from the guide grooves 35 and 36, when the brushes 37 and 38 are mounted to the brush holders 32 and 33, or replaced by other brushes. It is also possible to facilitate the assembling and replacing of the brushes 37 and 38, and the coil springs 39 and 40 can not be lost.

Moreover, one ends of the coil springs 39 and 40 can not jounce at the closed outer ends of the guide grooves 35 and 36, and spring forces in the longitudinal direction of the guide grooves 35 and 36, i.e., in the radial direction of the commutator 31 are applied to the brushes 37 and 38 from the coil springs 39 and 40. Thus, it is possible to prevent uneven wearing of the brushes 37 and 38.

In addition, the turning of the covers 45 and 48 about the axes of the threaded bores 41 and 42 are inhibited by the engagement of the engage portions 45a and 48a of the covers 45 and 48 with the outer sides of the brush holders 32 and 33, respectively. Therefore, when the threaded members 47 and 50 are screwed into the threaded bores 41 and 42, the covers 45 and 48 can not be turned with such screwing. Thus, the mounting of the covers 45 and 48 to the brush holders 32 and 33 is facilitated, and the assembling of the brushes 37 and 38 can be achieved easier.

When the casing body 14 is molded from a synthetic resin into the bottomed cylinder-like configuration with the first bracket 13 provided at one end of the cylindrical portion 12, the yoke 22 and the pair of magnets 23 are integrally coupled to the casing body 14. The yoke 22 is sandwiched between the clamping portions $57_1$ and $57_2$ and the cylindrical portion 12 of the casing body 14. The magnets 23 abut against the inner surface of the yoke 22 with their opposite side ends in the circumferential direction of the cylindrical portion 12 being defined by the clamping portions $57_1$ and $57_2$ and with their opposite ends in the axial direction of the cylindrical portion 12 being defined by the first bracket 13 and the magnet retaining portions 58. Multi-stage drawing steps were required in the production of the known electric rotating machine in which a bottomed cylinder-like casing body is integrally formed with a cylindrical yoke and a bracket integrally formed from a magnetic sheet metal by drawing. On the contrast, for producing the electric rotating machine according to the present invention, only molding of the casing body 14 is required, which can contribute to a substantial reduction in number of producing steps.

Moreover, even when the electric rotating machine is used in a corrodible environment such as on the sea, it is unnecessary to subject the electric rotating machine to a plating or a coating and yet, a sufficient anti-corrosion can be obtained, because the casing body 14 is made of synthetic resin. Because the plating or coating is not required, it is possible to reduce the number of producing steps.

In addition, because the pair of magnets 23 are formed integrally on the casing body 14 upon molding of the casing body 14, there is no need for a bonding which has been required in the prior art. This also makes it possible to reduce the number of producing steps and to eliminate the need for a separate producing line required for the bonding, thereby establishing a consistent producing line.

Further, the insertion bores $59_1$ and $59_2$ provided in the clamping portion $57_1$ for receiving the cords $55_1$ and $55_2$ inserted therein are formed by the insertion bore forming pins $78_1$ and $78_2$ provided in the lower die 72 upon formation of the casing body 14 by molding. The insertion bore forming pins $78_1$ and $78_2$ have axes extending in directions to open the upper and lower dies 71 and 72 and hence, it is possible to simplify the construction of the dies and draw out the cords $55_1$ and $55_2$ outwards from the side of the first bracket 13. Moreover, the insertion bore forming pins $78_1$ and $78_2$ also act to define circumferential one side ends of the pair of the magnets 23, 23 when the casing body 14 is formed by molding.

The cords $55_1$ and $55_2$ inserted through the insertion bores $59_1$ and $59_2$ are also inserted through the grommets $65_1$ and $65_2$ made of the elastomeric material. The grommets $65_1$ and $65_2$ are fitted into the tapered bores $60_1$ and $60_2$ provided in the first bracket 13. Moreover, the grommets $65_1$ and $65_2$ are urged against the inner surfaces of the tapered bores $60_1$ and $60_2$ compressed axially to come into close contact with the outer surface of the cords $55_1$ and $55_2$ by the abutment of the holder 66 fastened to the first bracket 13 against the grommets $65_1$ and $65_2$. Therefore, the fastening of the holder 66 to the first bracket 13 achieves a reliable water-proof sealing of the portions of the cords $55_1$ and $55_2$ drawn-out to the outside, and inhibits the movement of the cords $55_1$ and $55_2$ in a withdrawing direction. Thus, it is possible to provide a reduction in number of parts or components and to facilitate the assembling.

Figure 13:
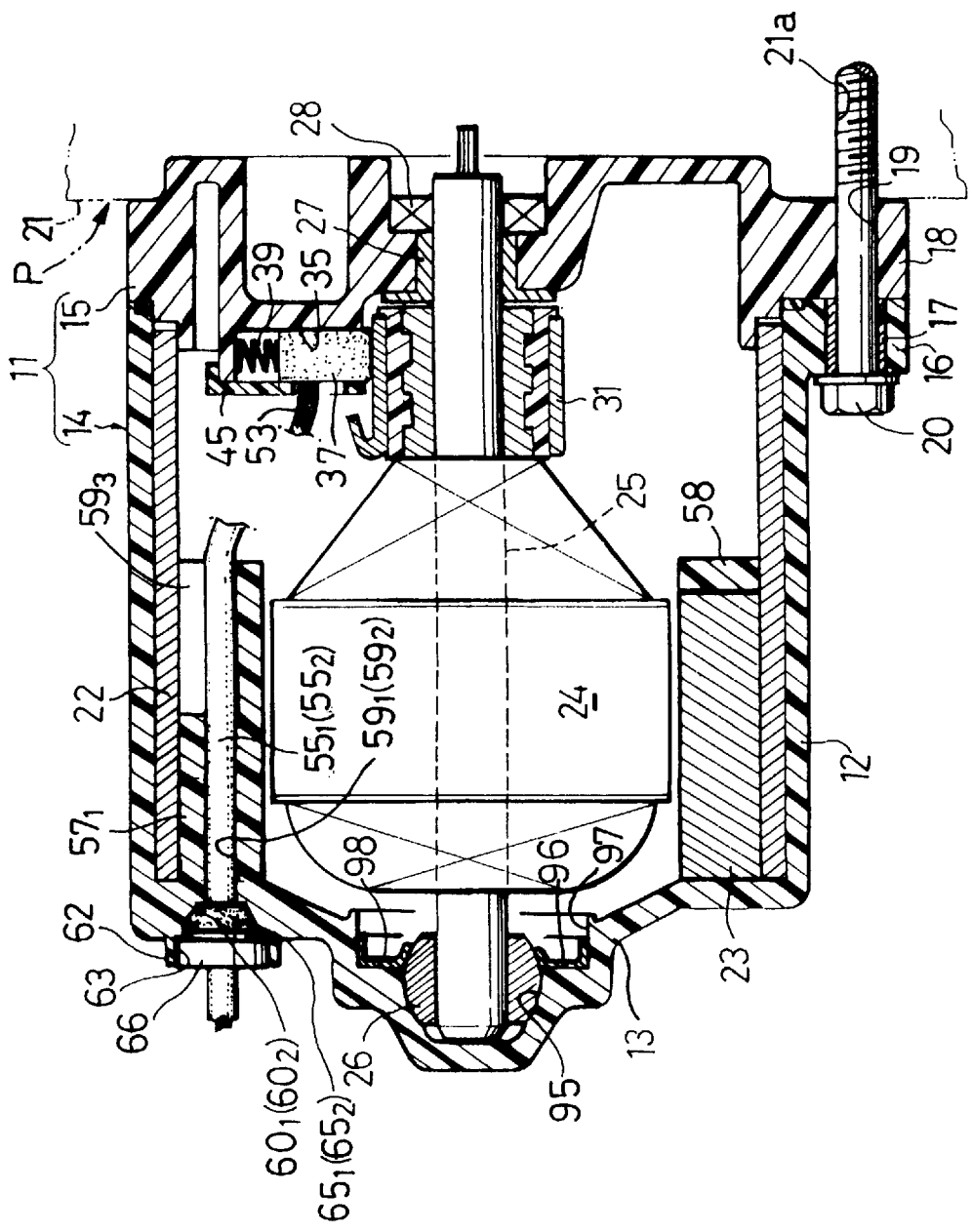
Figure 14:
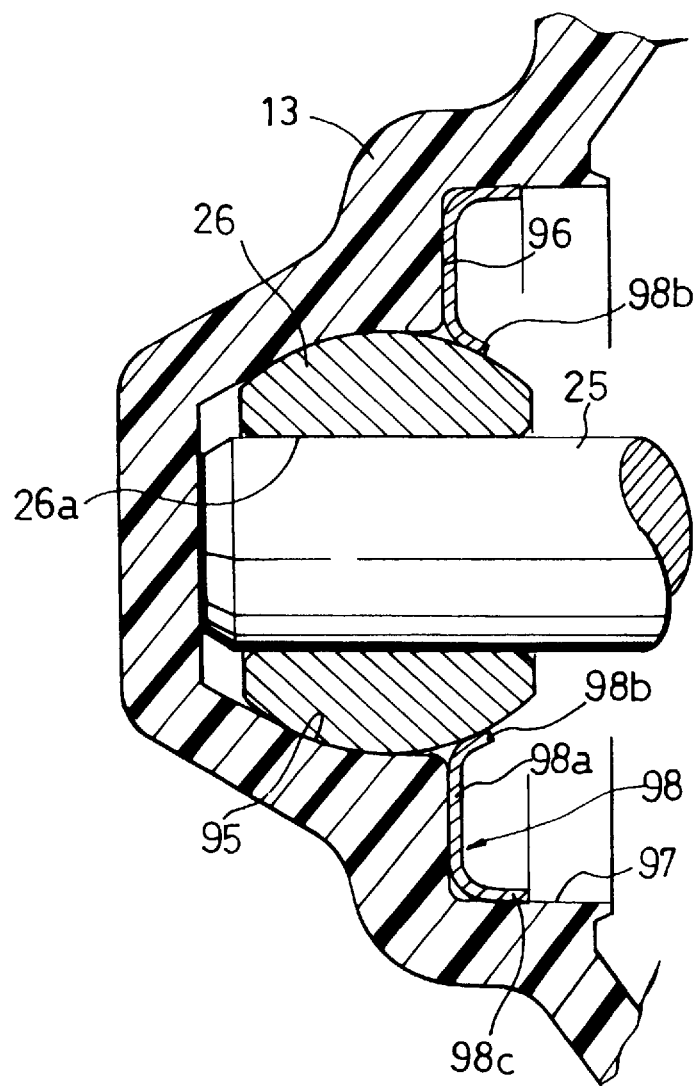
Figure 15:
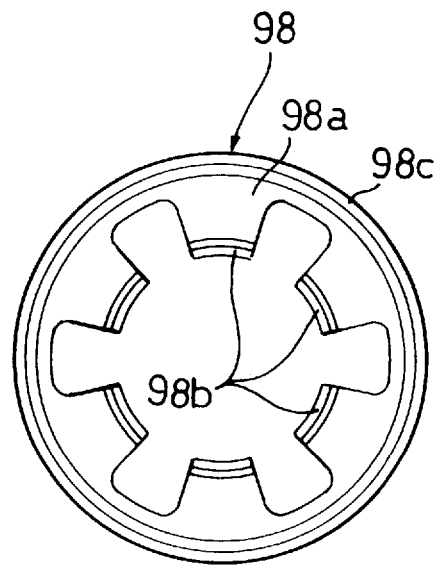

FIGS. 13 to 15 illustrate a second embodiment of the present invention. The first bracket 13 is provided, on an inner surface of its central portion, with a first fitting recess 95 which has a spherical inner surface and into which a portion of the self-aligning bearing metal 26 is oscillatably fitted, and a second fitting recess 97 defined with a diameter larger than that of the first fitting recess 95 to form an annular stepped portion 96 between the second fitting recess 97 itself and an outer end of the first fitting recess 95. The self-aligning bearing 26 having the portion fitted into the first fitting recess 95 is oscillatably carried on the first bracket 13 in such a manner that it is clamped between a metal holder 98 made of a metal fitted into and fixed in the second fitting recess 97 and the first bracket 13.

The metal holder 98 is formed by pressing of a plate made of a metal (e.g., JIS S65CM) and includes a base portion 98a formed into an annular shape, retaining portions 98b, 98b provided at a plurality of points, e.g., six circumferentially spaced points in an inner periphery of the base portion 98a, and a fitting cylindrical portion 98c connected at its base end to an outer periphery of the base portion 98a.

When the base portion 98a of the metal holder 98 is brought into contact with the stepped portion 96 between the first and second fitting recesses 95 and 97, the retaining portions 98b, 98b are brought into resilient contact with an outer surface of that portion of the self-aligning bearing 26 partially fitted in the first fitting recess 95 which protrudes from the first fitting recess 95, at a plurality of circumferentially spaced points in such an outer surface, thereby inhibiting the slip-off of the self-aligning bearing 26 from the first fitting recess 95 and exhibiting a resilient force for urging the self-aligning bearing 26 against the spherical inner surface of the first fitting recess 95.

The fitting cylindrical portion 98c is formed into a tapered shape with the diameter thereof gradually increasing in a direction away from the base portion 98a, and is fitted into the second fitting recess 97 while flexing the first bracket 13. In a condition in which the fitting cylindrical portion 98c is fitted into the second fitting recess 97 until the base portion 98a has been brought into contact with the stepped portion 96, a tip end of the fitting cylindrical portion 98c bits into the inner surface of the second fitting recess 97, thereby fixing the metal holder 98 to the first bracket 13. In this case, it is desirable that the second fitting recess 97 is formed into a tapered shape with the diameter thereof gradually decreasing in a direction away from the stepped portion 96, in order to reliably achieve the biting of the tip end of the fitting cylindrical portion 98c into the inner surface of the second fitting recess 97.

According to the second embodiment, by the fact that the portion of the self-aligning bearing 26 is fitted into the first fitting recess 95 provided in the first bracket 13 and also fitted into the second fitted recess 97 in the manner that the tip end of the fitting cylindrical portion 98c bites into the inner surface of the second fitting recess 97, the plurality of retaining portions 98b, 98b provided on the metal holder 98 fixed to the first bracket 13 are brought into contact with the outer surface of the portion of the self-aligning bearing 26 projecting from the first fitting recess 95, whereby the slip-off of the self-aligning bearing 26 from the first fitting recess 95 is inhibited, and the self-aligning bearing 26 is clamped between the first bracket 13 and the metal holder 98.

Therefore, as compared with the electric rotating machine in which the self-aligning bearing 26 is press-fitted into the first bracket 13 which is in a relatively-high temperature state immediately after formation of the casing body 14 made of the synthetic resin, it is unnecessary to make it a necessary condition that the casing body 14 is in a relatively high-temperature state, and it is possible to assemble the self-aligning bearing 26 to the casing body 14 having ambient temperature. As a result, the temperature control of the casing body 14 is not required, and the timing of assembling the self-aligning bearing 26 to the first bracket 13 is not limited, thereby making it possible to increase the degree of freedom of the timing of assembling.

The retaining portions 98b, 98b are connected to the inner periphery of the base portion 98a at a plurality of circumferentially spaced points in the base portion 98a in such a manner that a resilient force for urging the self-aligning bearing 26 toward the spherical inner surface of the first fitting recess 95. Thus, the self-aligning bearing 26 can be oscillatably carried between the spherical inner surface of the first fitting recess 95 and the retaining portions 98b, 98b.

Although the embodiments of the present invention have been described in detail, it will be understood that the present invention is not limited to the above-described embodiments, and various modifications in design may be made without departing from the spirit and scope of the invention defined in claims.

For example, the present invention is applicable to a DC motor having four or more magnets. A slit may be provided in the tip end of the fitting cylindrical portion 98c, so that the tip end of the fitting cylindrical portion 98c has a resilience in a radial direction thereof. Thus, it is easy to fit the fitting cylindrical portion 98c into the second fitting recess 97.

What is claimed is:

1. An electric rotating machine comprising:
   rotor which is rotatably supported at axially opposite ends of a casing having a cylindrical yoke and which is coaxially surrounded by the yoke, and
   magnets disposed at a plurality of points equally spaced apart in a circumferential direction of an inner surface of the yoke,
   wherein said casing comprises a casing body made by forming a synthetic resin into a bottomed cylinder-like configuration with a first bracket for rotatably supporting one end of the rotor being integrally provided at one end of a cylindrical portion of said casing body surrounding said yoke, and a second bracket which rotatably supports the other end of said rotor and which is coupled to the other end of said cylindrical portion of the casing body,
   wherein said casing body is provided with a plurality of clamping portions which are connected at their base ends to said first bracket at locations equally spaced apart in a circumferential direction of said cylindrical portion and which extend toward the axial other end of said cylindrical portion, and magnet retaining portions are formed to extend respectively from tip ends of said clamping portions in the circumferential direction of said cylindrical portion, and the yoke and the plurality of magnets are integrally coupled to the casing body upon formation of said casing body by molding, said yoke being clamped between said clamping portions and said cylindrical portion, and said magnets being in abutment against the inner surface of said yoke with opposite side ends of said respective magnets in the circumferential direction of said cylindrical portion being defined by said clamping portions and with opposite ends of the magnets in the axial direction of said cylindrical portion being defined by said first bracket and said magnet retaining portions.

2. An electric rotating machine according to claim 1, wherein one of the clamping portions has a pair of insertion bores, and a pair of cords are drawn out from said insertion bores to outside of said casing body, said pair of cords being connected to a pair of brushes which are in sliding contact with a commutator provided in the rotor.

3. An electric rotating machine according to claim 1, wherein one end of a rotary shaft provided to said rotor is fitted into a self-aligning bearing having a spherical outer surface, and an inner surface of said first bracket has a supporting recess and a plurality of retaining claws, said supporting recess and said retaining claws extend along an outer surface of said self-aligning bearing, said retaining claws being connected to an inner surface of the supporting recess at locations spaced apart in a circumferential direction of said supporting recess, said self-aligning bearing being fitted in the supporting recess while flexing the retaining claws in an expanding direction and oscillatably retained by the supporting recess and said retaining claws.

4. An electric rotating machine according to claim 1, wherein one end of a rotary shaft provided to said rotor is fitted into a self-aligning bearing having a spherical outer surface, and an inner surface of said first bracket has a first fitting recess and a second fitting recess, said first fitting recess having a spherical inner surface to support said self-aligning bearing for oscillating movement, a portion of said self-aligning bearing being fitted into said first fitting recess, said second fitting recess being defined with a diameter larger than that of said first fitting recess to define an annular stepped portion between said second fitting recess and an outer end of said first fitting recess, and wherein a metal holder is fixed to said first bracket with a tip end of a fitting cylindrical portion of the metal holder biting into an inner surface of said second fitting recess, said metal holder including an annular base portion which is in contact with said stepped portion, a retaining portion which is connected to an inner periphery of said base portion at a plurality of points spaced apart in a circumferential direction of said base portion to come into contact with an outer surface of that portion of said self-aligning bearing which protrudes from said first fitting recess to exhibit a resilient force urging said self-aligning bearing toward the spherical inner surface of said first fitting recess, and a fitting cylindrical portion which is connected at its base end to an outer periphery of said base portion and which is formed into a tapered shape with its diameter increasing in a direction away from its base portion.

5. An electric rotating machine according to claim 2, wherein said first bracket has tapered bores provided therein with a diameter of each said tapered bore gradually increasing axially outwards, said tapered bores being coaxially connected to the insertion bores, and wherein grommets made of an elastomeric material are fitted into the tapered bores, respectively, said cords passing through said grommets, and a holder is fastened to the first bracket in abutting against both said grommets.

6. An electric rotating machine according to claim 2, wherein one end of a rotary shaft provided to said rotor is fitted into a self-aligning bearing having a spherical outer surface, and an inner surface of said first bracket has a supporting recess and a plurality of retaining claws, said supporting recess and said retaining claws extend along an outer surface of said self-aligning bearing, said retaining claws being connected to an inner surface of the supporting recess at locations spaced apart in a circumferential direction of said supporting recess, said self-aligning bearing being fitted in the supporting recess while flexing the retaining claws in an expanding direction and oscillatably retained by the supporting recess and said retaining claws.

7. An electric rotating machine according to claim 2, wherein one end of a rotary shaft provided to said rotor is fitted into a self-aligning bearing having a spherical outer surface, and an inner surface of said first bracket has thereof a first fitting recess and a second fitting recess, said first fitting recess having a spherical inner surface to support said self-aligning bearing for oscillating movement, a portion of said self-aligning bearing being fitted into said first fitting recess, said second fitting recess being defined with a diameter larger than that of said first fitting recess to define an annular stepped portion between said second fitting recess and an outer end of said first fitting recess, and wherein a metal holder is fixed to said first bracket with a tip end of a fitting cylindrical portion of the metal holder biting into an inner surface of said second fitting recess, said metal holder including an annular base portion which is in contact with said stepped portion, a retaining portion which is connected to an inner periphery of said base portion at a plurality of points spaced apart in a circumferential direction of said base portion to come into contact with an outer surface of that portion of said self-aligning bearing which protrudes from said first fitting recess to exhibit a resilient force urging said self-aligning bearing toward the spherical inner surface of said first fitting recess, and a fitting cylindrical portion which is connected at its base end to an outer periphery of said base portion and which is formed into a tapered shape with its diameter increasing in a direction away from its base portion.

8. An electric rotating machine according to claim 5, wherein one end of a rotary shaft provided to said rotor is fitted into a self-aligning bearing having a spherical outer surface, and an inner surface of said first bracket has a supporting recess and a plurality of retaining claws, said supporting recess and said retaining claws extend along an outer surface of said self-aligning bearing, said retaining claws being connected to an inner surface of the supporting recess at locations equally spaced apart in a circumferential direction of said supporting recess, said self-aligning bearing being fitted in the supporting recess while flexing the retaining claws in an expanding direction and oscillatably retained by the supporting recess and said retaining claws.

9. An electric rotating machine according to claim 5, wherein one end of a rotary shaft provided to said rotor is fitted into a self-aligning bearing having a spherical outer surface, and an inner surface of said first bracket has a first fitting recess and a second fitting recess in an inner, said first fitting recess having a spherical inner surface to support said self-aligning bearing for oscillating movement, a portion of said self-aligning bearing being fitted into said first fitting recess, said second fitting recess being defined with a diameter larger than that of said first fitting recess to define an annular stepped portion between said second fitting recess and an outer end of said first fitting recess, and said machine further includes a metal holder which is fixed to said first bracket with a tip end of a fitting cylindrical portion of the metal holder biting into an inner surface of said second fitting recess, said metal holder including an annular base portion which is in contact with said stepped portion, a retaining portion which is connected to an inner periphery of said base portion at a plurality of points spaced apart in a circumferential direction of said base portion to come into contact with an outer surface of that portion of said self-aligning bearing which protrudes from said first fitting recess to exhibit a resilient force urging said self-aligning bearing toward the spherical inner surface of said first fitting recess, and a fitting cylindrical portion which is connected at its base end to an outer periphery of said base portion and which is formed into a tapered shape with its diameter increasing in a direction away from its base portion.

* * * * *